United States Patent
Pousseo et al.

(10) Patent No.: US 9,494,079 B2
(45) Date of Patent: Nov. 15, 2016

(54) TURBINE ENGINE FUEL INJECTOR WITH PERMANENT LEAKAGE FLOW

(71) Applicant: SNECMA, Paris (FR)

(72) Inventors: Emilie Charlotte Pousseo, Paris (FR); Jose Roland Rodrigues, Nandy (FR)

(73) Assignee: SNECMA, Paris (FR)

( * ) Notice: Subject to any disclaimer, the term of this patent is extended or adjusted under 35 U.S.C. 154(b) by 268 days.

(21) Appl. No.: 14/378,797

(22) PCT Filed: Feb. 12, 2013

(86) PCT No.: PCT/FR2013/050280
§ 371 (c)(1),
(2) Date: Aug. 14, 2014

(87) PCT Pub. No.: WO2013/124568
PCT Pub. Date: Aug. 29, 2013

(65) Prior Publication Data
US 2015/0007572 A1 Jan. 8, 2015

(30) Foreign Application Priority Data
Feb. 24, 2012 (FR) ..................... 12 51727

(51) Int. Cl.
*F02C 7/232* (2006.01)
*F02C 7/22* (2006.01)
*F02C 9/26* (2006.01)
*F23K 5/14* (2006.01)
*F23R 3/28* (2006.01)
*F23D 11/26* (2006.01)
(Continued)

(52) U.S. Cl.
CPC ................. *F02C 7/22* (2013.01); *F02C 7/222* (2013.01); *F02C 7/232* (2013.01); *F02C 9/263* (2013.01); *F23D 11/26* (2013.01); *F23K 5/147* (2013.01); *F23R 3/28* (2013.01);*F23D 2900/00016* (2013.01); *F23K 2900/05001* (2013.01); *F23K 2900/05141* (2013.01); *F23N 2035/24* (2013.01); *F23R 2900/00004* (2013.01)

(58) Field of Classification Search
CPC .......... F02C 7/22; F02C 7/232; F02C 9/263; F02C 7/222; F23K 5/147; F23K 2900/05141; F23D 11/26; F23D 2900/00016; F23R 3/28; F23R 2900/00004
See application file for complete search history.

(56) References Cited

U.S. PATENT DOCUMENTS

| | | | |
|---|---|---|---|
| 4,655,912 A * | 4/1987 | Bradley | F02C 9/263 210/133 |
| 2003/0093998 A1 | 5/2003 | Michau et al. | |
| 2003/0094203 A1 | 5/2003 | D'Agostino et al. | |
| 2009/0173810 A1* | 7/2009 | Rodrigues | F02C 7/232 239/533.3 |
| 2010/0037615 A1 | 2/2010 | Williams et al. | |

FOREIGN PATENT DOCUMENTS

| | | |
|---|---|---|
| EP | 1 312 863 | 5/2003 |
| EP | 1 312 864 | 5/2003 |

OTHER PUBLICATIONS

International Search Report Issued May 6, 2013 in PCT/FR13/050280 Filed Feb. 12, 2013.
U.S. Appl. No. 14/378,816, filed Aug. 14, 2014, Rodrigues, et al.

* cited by examiner

*Primary Examiner* — Gerald L Sung
*Assistant Examiner* — Scott Walthour
(74) *Attorney, Agent, or Firm* — Oblon, McClelland, Maier & Neustadt, L.L.P.

(57) ABSTRACT

A fuel injector for a turbine engine, the injector including a body including a mechanism for admitting fuel under pressure, a stop valve for feeding a primary fuel circuit, and a metering valve mounted downstream from the stop valve for feeding a secondary fuel circuit. The injector further includes at least one leakage channel, that can be formed by a thread, that extends from a zone situated downstream from the stop valve and upstream from the metering valve to a zone situated downstream from the metering valve to generate a permanent leakage flow in the secondary circuit.

8 Claims, 2 Drawing Sheets

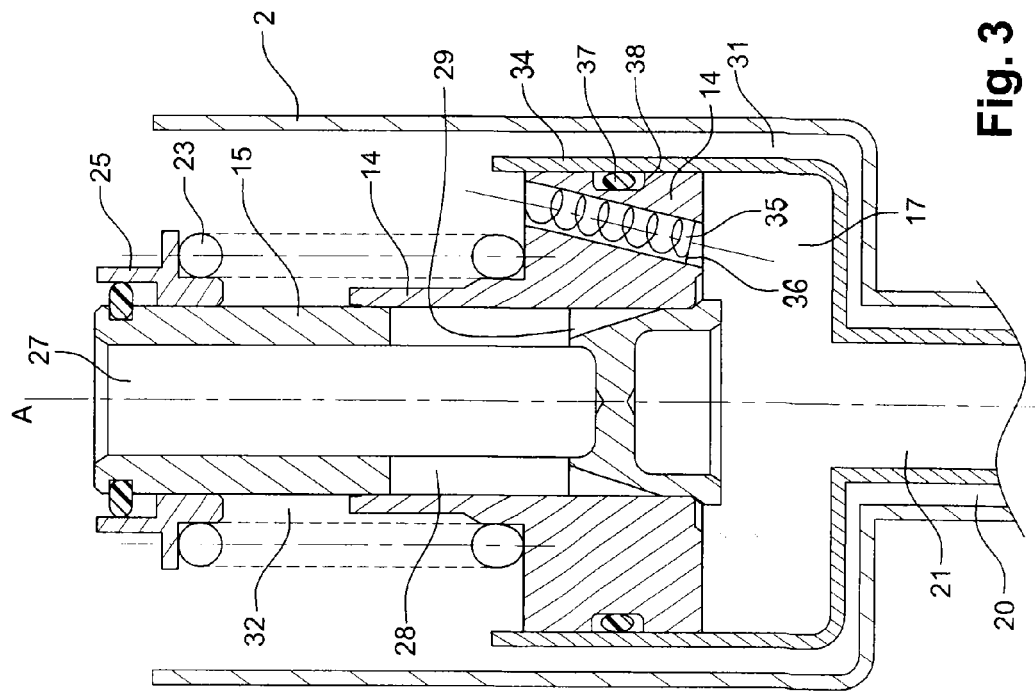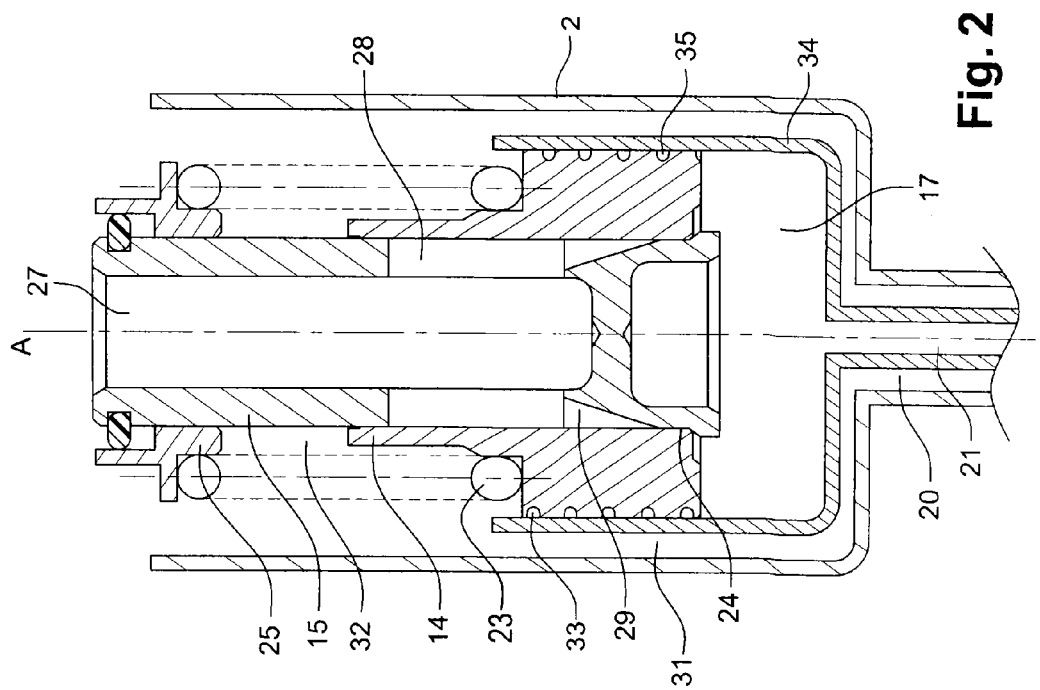

TURBINE ENGINE FUEL INJECTOR WITH PERMANENT LEAKAGE FLOW

The present invention relates to a fuel injector for a turbine engine such as an airplane turboprop or turbojet.

A turbine engine conventionally comprises an annular combustion chamber having fuel injectors regularly distributed at its upstream end together with means for feeding air around the injectors.

There are two main types of injector, namely so-called "aeromechanical" injectors having two fuel circuits providing fuel flow rates matching different operating stages of the turbine engine (starting stage, stages of operation at low power or at full power), and so-called "aerodynamic" injectors that have only one fuel circuit for all operating stages of the turbine engine.

Patent application FR 2 832 492 in the name of the Applicant describes an aeromechanical type injector having a primary fuel circuit, e.g. for starting and for low power stages, and a secondary circuit that is involved in subsequent operating stages at medium to high power, in addition to the primary circuit.

That type of injector comprises a body having admission means for admitting fuel under pressure, a stop valve mounted in the body downstream from the admission means and designed to open at a first determined fuel pressure and to remain open beyond said first pressure in order to feed a primary fuel circuit, and a metering valve mounted in the body downstream from the stop valve and designed to open beyond a second determined fuel pressure greater than the first pressure, and to remain open beyond the second pressure in order to feed a secondary fuel circuit.

The flow rate of fuel in the secondary circuit is controlled by means of metering slots formed in the metering valve and of flow sections that vary as a function of the position of the valve, i.e. as a function of the fuel feed pressure. The greater the fuel feed pressure, the greater the flow sections of the slots.

During stages of starting and operation at low power, the metering valve is closed. The fuel present in the secondary circuit does not flow, but it is subjected to high temperatures that can lead to it coking in the secondary circuit, where that is prejudicial to the proper operation and to the lifetime of the injector.

By way of example, that phenomenon occurs while the airplane is descending, during a period of operating at low power following a period of operating at full power. Under such circumstances, the environment of the injector may reach temperatures lying in the range 80° C. to 600° C.

Means exist for limiting the extent to which the fuel in the secondary circuit is heated, such as installing one or more heat shields.

Nevertheless, such shields are not certain to prevent the above-described phenomenon of coking.

A particular object of the invention is to provide a solution to this problem that is simple, effective, and inexpensive.

To this end, the invention provides a fuel injector for a turbine engine such as an airplane turboprop or turbojet, the injector comprising a body having admission means for admitting fuel under pressure, a stop valve mounted in the body downstream from the admission means and designed to open at a first determined fuel pressure and to remain open beyond said first pressure in order to feed a primary fuel circuit, and a metering valve mounted in the body downstream from the stop valve and designed to open beyond a second determined fuel pressure greater than the first pressure, and to remain open beyond the second pressure in order to feed a secondary fuel circuit, the injector being characterized in that it includes at least one leakage channel extending from a zone situated downstream from the stop valve and upstream from the metering valve to a zone situated downstream from the metering valve in order to generate a permanent leakage flow in the secondary circuit.

The leakage flow prevents fuel stagnating in the secondary circuit and thus prevents it from coking, in particular during stages of starting and operating at low power. It should be observed that the leakage flow is permanent, i.e. it is established under all stages of operation, equally when starting or at low power and when operating at medium or high power.

Preferably, the leakage channel is in the form of a coil or a labyrinth, so as to generate considerable head loss even though the flow section is large. This considerable head loss serves to limit the leakage flow rate and thus also to limit non-uniformity in the combustion chamber, in particular during stages of operation at medium and high power. A large flow section also serves to avoid any risk of the leakage channel being clogged by impurities.

By way of example, the leakage channel is of helical or spiral shape and may extend around an axis coinciding with the axis of the metering valve.

In an embodiment of the invention, the metering valve is movably mounted in a tubular support, a helical groove being formed in the outer wall of the tubular support, a bushing surrounding the tubular support so as to cover the helical groove and form the leakage channel that opens out at its ends respectively upstream and downstream from the metering valve.

In another embodiment of the invention, the metering valve is movably mounted in a tubular support having a hole offset relative to the axis of the metering valve, and having housed therein an insert, the leakage channel being formed in the insert.

The invention also provides a turbine engine such as an airplane turboprop or turbojet including at least one injector of the above-specified type.

The invention can be better understood and other details, characteristics, and advantages appear on reading the following description made by way of non-limiting example and with reference to the accompanying drawings, in which:

FIGS. 2 and 3 are longitudinal section views of a portion of an injector in two embodiments of the invention.

Figure 1:
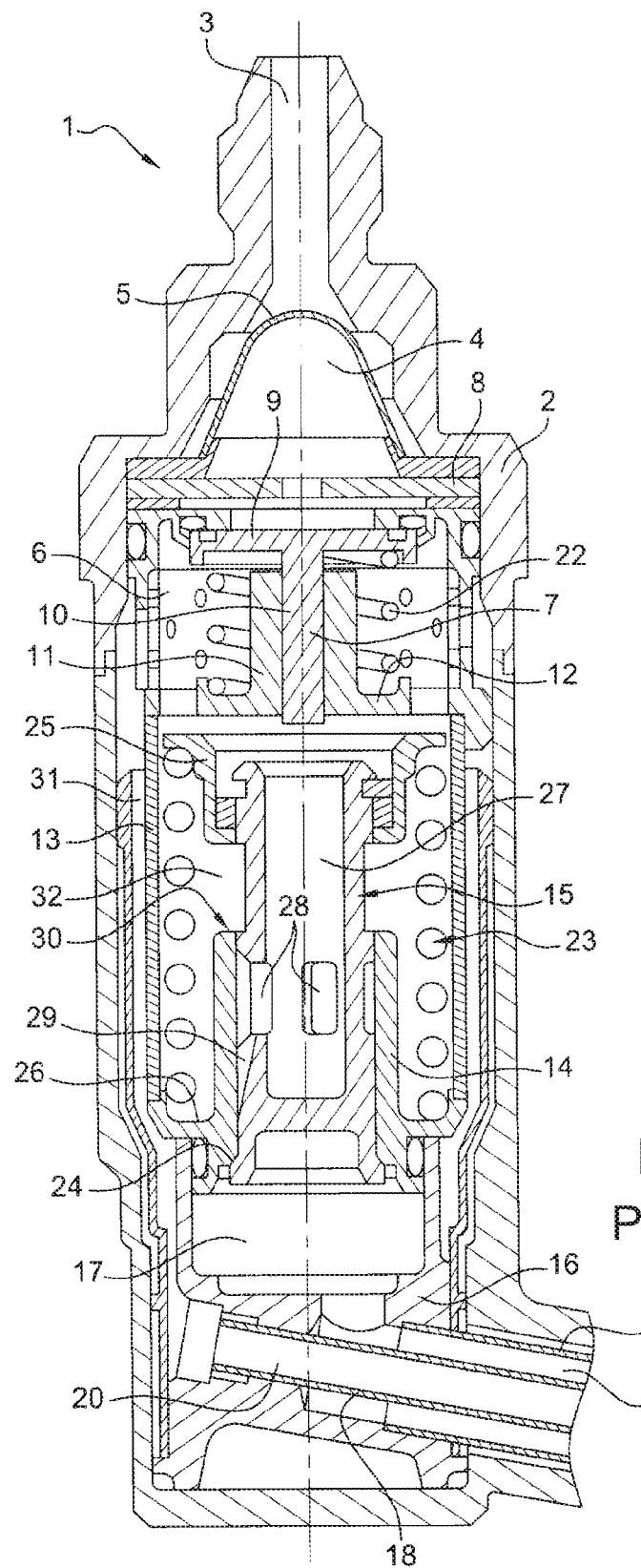
FIG. 1 is a longitudinal section view of a prior art fuel injector.

A fuel injector 1 as disclosed in patent application FR 2 832 492 in the name of the Applicant is shown in FIG. 1.

That injector 1 is of the aeromechanical type and includes a primary fuel circuit, e.g. for use during starting and low-power stages, and a secondary circuit that is involved during later stages of operation, at medium and high power, in addition to the primary circuit.

The injector 1 has a hollow body 2 with a fuel admission orifice 3 that is to receive the fuel under pressure coming from a fuel pump (not shown), and opening out into a pre-admission chamber 4 after passing through a filter screen 5.

The body 2 also has an admission chamber 6 situated downstream (in the flow direction for fuel through the injector) from the pre-admission chamber 4 and separated therefrom by a stop valve 7. A diaphragm 8 is placed between the pre-admission chamber 4 and the stop valve 7.

The stop valve 7 has a head 9 and a stem 10 movably mounted in a tubular portion 11 of an annular support 12 that is stationary relative to the body 2. The support rests on a tubular bushing 13 extending downwards and itself resting on another tubular support 14 having a metering valve 15 mounted therein. Finally, the support 14 rests on a part 16 defining a reception chamber 17 situated under the metering valve 15 and serving to support two coaxial tubes 18 and 19.

The inner tube 18 forms a duct 20 for passing a primary flow of fuel, the annular space between the two tubes 18 and 19 forming a duct 21 for passing a secondary flow of fuel.

An annular space 31 forming part of the primary circuit is defined between the outer wall of the bushing 13 and the body 2. The inner wall of the bushing 13 also defines an inner chamber 32 situated upstream from the metering valve 15.

The stop valve 7 is held in the closed position by a return spring 22, with the stop valve 7 being opened when the pressure of the fuel upstream from this valve exceeds a first predetermined value P1.

The metering valve 15 is also held in the closed position by a return spring 23, with the metering valve 15 opening when the pressure of the fuel upstream from the valve 15 exceeds a second predetermined value P2, greater than the above-mentioned first value P1.

The metering valve 15 has a bottom end forming a head that is to rest on a seat 24 of the corresponding support, and a top end where a cup 25 is fastened. The return spring bears firstly against the cup 25 and secondly against a radial surface 26 of the support 14.

The metering valve 15 has a central axial hole 27 and radial openings 28 opening out into the central hole 27 and into metering slots 29 presenting appropriate shapes that are formed in the outer surface of the metering valve 15.

The metering valve 15 is movable between two extreme positions, respectively a completely closed position in which its head rests on the seat 24 of the support 14 under the action of the corresponding return spring 23, and a completely open position in which the cup 25 comes into abutment against the top end 30 of the tubular support 14.

In the completely closed position of the metering valve 15, as shown in FIG. 1, the openings 28 and the slots 29 are situated facing the tubular support 14, the bottom ends of the slots 29 not opening out into the reception chamber 17. In this position, the fuel present in the chamber 32 thus cannot flow into the reception chamber 17 or into the secondary duct 21.

When the pressure of the fuel situated in the chamber 32 increases, this pressure causes the metering valve 15 to move towards its open position, i.e. downwards, against the force exerted by the return spring 23.

When this pressure exceeds the second value P2, the slots 29 open out into the reception chamber 17 and the fuel can flow into the secondary duct 21.

The shapes of the slots 29 are such that the flow sections of the slots 29 vary as a function of the position of the metering valve 15. In particular, the higher the pressure of the fuel in the chamber 27, the larger the flow sections of the slots 29.

In operation, several situations may arise.

In a first situation, the pressure of the fuel in the preadmission chamber 4 is less than P1. The stop valve 7 is then held in the closed position by the return spring 22 and the fuel flows neither into the primary duct 20 nor into the secondary duct 21.

In a second situation, corresponding to a starting stage or to operating at low power, the pressure of the fuel in the preadmission chamber 4 is greater than P1, but the pressure of the fuel in the chamber 32 is less than P2. The stop valve 7 is then open and the fuel can flow into the annular space 31 and then into the primary duct 20 (primary circuit). The metering valve 15 nevertheless remains closed, and the fuel does not flow in the secondary duct 21.

In a third situation, corresponding to a stage of operating at medium or full power, the pressure of the fuel in the preadmission chamber 4 is greater than P1 and the pressure of the fuel in the chamber 32 is greater than P2. The stop valve 7 is open and the fuel can flow into the annular space 31 and then into the primary duct 20 (primary circuit). In addition, the metering valve 15 is also open and the fluid can flow through the chamber 32, the openings 28, the slots 29, and the reception chamber 17, and then the secondary duct 21 (secondary circuit).

As mentioned above, in the second operating situation, the secondary duct 21 may be subjected to an environment that is very hot and there is a risk of the fuel that is present in the duct 21 coking.

FIG. 2 shows a portion of an injector 1 in a first embodiment of the invention, in which a helical groove 33 is formed in the outer wall of the tubular support 14, a bushing 34 surrounding the tubular support 14 so as to cover the helical groove 33 and form a helical leakage channel 35 opening out at its ends respectively upstream and downstream from the metering valve 15, i.e. respectively into the chambers 32 and 17.

By way of example, the flow section of the leakage channel 35 is greater than 0.3 square millimeters ($mm^2$) in order to avoid any risk of the channel 35 becoming blocked, and it preferably lies in the range 0.3 $mm^2$ to 0.4 $mm^2$. The total length of the leakage channel 35 lies in the range 400 millimeters (mm) to 500 mm. The head loss generated by this channel 35 lies in the range 0.1 bars to 1.5 bars.

The bushing 34, in this embodiment, also defines the reception chamber 17 and the secondary duct 21. Naturally, the reception chamber 17 and the secondary duct 21 may be formed by elements that are mutually distinct, as in FIG. 1.

Likewise, in this embodiment, the body 2 has a narrowed downstream end defining the primary duct 20, which is of annular shape and surrounds the secondary duct 21. Naturally, this duct 20 may be formed by a distinct element of the body 2, as in FIG. 1.

FIG. 3 shows an embodiment of the invention in which the tubular support 14 has a hole that is offset from the axis A of the body 2 and of the metering valve 15, which hole receives an insert 36. This insert 36 has a helical thread on its cylindrical outer surface, which thread co-operates with the cylindrical surface of the hole to define a helical leakage channel 35 having the required dimensions.

This leakage channel has a triangular section, e.g. of 0.7 mm×0.7 mm.

Sealing means such as an O-ring 37 are also provided between the radially outer periphery of the tubular element 14 and the bushing 34. By way of example, the O-ring 37 is housed in a groove 38 of the tubular support 14.

The leakage channel 35 prevents fuel stagnating in the secondary duct 21 during stages of starting and of operating at low power, i.e. when the metering valve 15 is not yet open, thereby preventing the fuel in the secondary circuit 17, 21 from coking.

The helical shape of the leakage channel 35 generates considerable head loss which makes it possible to conserve a flow section that is sufficiently large.

As mentioned above, considerable head loss limits the leakage flow rate and thus also limits non-uniformity in the combustion chamber, in particular during stages of operation at medium or high power. A large flow section also serves to avoid any risk of the leakage channel 35 becoming blocked.

The invention claimed is:

1. A fuel injector for a turbine engine or an airplane turboprop or turbojet, the fuel injector comprising:
    a body including an admission orifice for admitting fuel under pressure;
    a stop valve mounted in the body downstream from the admission orifice and configured to open at a first determined fuel pressure and to remain open beyond the first determined fuel pressure to feed a primary fuel circuit;
    a metering valve mounted in the body downstream from the stop valve and configured to open beyond a second determined fuel pressure greater than the first determined fuel pressure, and to remain open beyond the second determined fuel pressure to feed a secondary fuel circuit;
    a tubular support radially surrounding the metering valve, the metering valve configured to slide within the tubular support; and
    at least one leakage channel extending in the tubular support from a zone situated downstream from the stop valve and upstream from the metering valve to a zone situated downstream from the metering valve to generate a permanent leakage flow in the secondary fuel circuit.

2. The fuel injector according to claim 1, wherein the at least one leakage channel is formed as a coil or a labyrinth.

3. The fuel injector according to claim 2, wherein the at least one leakage channel is of helical or spiral shape.

4. The fuel injector according to claim 3, wherein the at least one leakage channel extends around an axis coinciding with an axis of the metering valve.

5. The fuel injector according to claim 3, wherein the at least one leakage channel includes a thread on a cylindrical surface of the tubular support.

6. The fuel injector according to claim 3, wherein a helical groove is formed in an outer wall of the tubular support, a bushing surrounds the tubular support to cover the helical groove, and the at least one leakage channel comprises two ends that open out, respectively, upstream and downstream from the metering valve.

7. The fuel injector according to claim 1, wherein the tubular support comprises a hole offset relative to an axis of the metering valve, the at least one leakage channel formed in an insert housed within the hole.

8. A turbine engine or an airplane turboprop or turbojet comprising at least one fuel injector according to claim 1.

* * * * *